US010695825B2

(12) United States Patent
Todorov et al.

(10) Patent No.: US 10,695,825 B2
(45) Date of Patent: Jun. 30, 2020

(54) METHOD AND SYSTEM FOR DIRECT CASTING OF CAST COMPONENTS BY ADDITIVE MANUFACTURING OF COMPOSITE MONOLITHIC MOLDS

(71) Applicant: "PRINT CAST" LTD, Sofia (BG)

(72) Inventors: Georgi Dimitrov Todorov, Sofia (BG); Tsvetozar Tihomirov Ivanov, Botevgrad (BG)

(73) Assignee: "PRINT CAST" LTD, Sofia (BG)

( * ) Notice: Subject to any disclaimer, the term of this patent is extended or adjusted under 35 U.S.C. 154(b) by 218 days.

(21) Appl. No.: 15/743,980

(22) PCT Filed: Jul. 12, 2016

(86) PCT No.: PCT/BG2016/050004
§ 371 (c)(1),
(2) Date: Jan. 11, 2018

(87) PCT Pub. No.: WO2017/008130
PCT Pub. Date: Jan. 19, 2017

(65) Prior Publication Data
US 2019/0022742 A1    Jan. 24, 2019

(30) Foreign Application Priority Data

Jul. 14, 2015 (BG) ........................................ 112056

(51) Int. Cl.
*B22C 9/02* (2006.01)
*B33Y 10/00* (2015.01)
(Continued)

(52) U.S. Cl.
CPC ................ *B22C 9/02* (2013.01); *B22D 47/02* (2013.01); *B28B 1/001* (2013.01); *B29C 64/165* (2017.08);
(Continued)

(58) Field of Classification Search
CPC .................................. B22C 9/02; B33Y 10/00
See application file for complete search history.

(56) References Cited

U.S. PATENT DOCUMENTS 5,814,161 A * 9/1998 Sachs ........................ B08B 3/10
134/21
6,155,331 A  12/2000 Langer et al.
(Continued)

FOREIGN PATENT DOCUMENTS

CN          1128966 A       8/1996
DE           440397 C       5/1927
(Continued)

OTHER PUBLICATIONS

International Search Report and Written Opinion for International Application No. PCT/BG2016/050004, dated Dec. 5, 2016.

*Primary Examiner* — Kevin E Yoon
(74) *Attorney, Agent, or Firm* — Marshall, Gerstein & Borun LLP (57) ABSTRACT

A method for direct casting of cast components by layer-wise generation of composite molds, wherein the composite molds are generated as monolithic elements and simultaneously with their respective cores in an assembled form. The system for layer-wise generation of three-dimensional models from the powdered material in a removable container with a movable bottom, which is separated from the device for lifting and lowering the movable bottom, which is built into the system for layer-wise generation of three-dimensional models. The generation of the molds is done by application of layers of powdered material and binding of the particles of each layer through a binder, added selectively according to a program/pattern only in the volumes, where the solid body of the model is being generated. This procedure is subsequently repeated until the entire volume is constructed, allowing direct casting in the resulting molds (Continued)

without removing them from the container, in which they are generated, after removing the unnecessary powdered material from their working cavities.

4 Claims, 6 Drawing Sheets

(51) Int. Cl.
| | | |
|---|---|---|
| *B33Y 80/00* | (2015.01) | |
| *B22D 47/02* | (2006.01) | |
| *B29C 64/165* | (2017.01) | |
| *B33Y 30/00* | (2015.01) | |
| *B28B 1/00* | (2006.01) | |

(52) U.S. Cl.
CPC ............... *B33Y 10/00* (2014.12); *B33Y 30/00* (2014.12); *B33Y 80/00* (2014.12); *Y02P 10/292* (2015.11)

(56) References Cited

U.S. PATENT DOCUMENTS

| | | | |
|---|---|---|---|
| 6,554,600 | B1 | 4/2003 | Hofmann et al. |
| 7,874,445 | B2 | 1/2011 | Hochsmann et al. |
| 8,651,167 | B1* | 2/2014 | Hasenbusch ......... B22D 15/005 |
| | | | 164/29 |
| 2004/0026418 | A1 | 2/2004 | Ederer et al. |
| 2004/0035542 | A1 | 2/2004 | Ederer et al. |
| 2013/0220572 | A1* | 8/2013 | Rocco ...................... B22C 9/02 |
| | | | 164/520 |

FOREIGN PATENT DOCUMENTS

| | | |
|---|---|---|
| DE | 4440397 C1 | 9/1995 |
| JP | H08509666 A | 10/1996 |
| JP | 2000-024756 A | 1/2000 |
| JP | 2002-527613 A | 8/2002 |
| JP | 3164596 U | 12/2010 |
| WO | WO-9532824 A1 | 12/1995 |
| WO | WO-200021736 A1 | 4/2000 |

* cited by examiner

METHOD AND SYSTEM FOR DIRECT CASTING OF CAST COMPONENTS BY ADDITIVE MANUFACTURING OF COMPOSITE MONOLITHIC MOLDS

CROSS-REFERENCE TO RELATED APPLICATION

The present application is the U.S. national phase of International Application No. PCT/BG2016/050004, filed Jul. 12, 2016, which claims priority to Bulgaria Application No. 112056, filed Jul. 14, 2015. The priority application, BG 112056, is hereby incorporated by reference.

FIELD OF THE INVENTION

The invention relates to a method and system for direct casting of cast components by additive manufacturing of monolithic composite molds from powdered material into a removable container with a movable bottom plate, by applying layers of a powdered material (sand) and binding of particles of each layer by a binder substance added selectively according to a program/template only in volumes, which solid model is being built and consistent repetition to build the entire volume, allowing direct casting in monolithic composite molds obtained after removing the unnecessary material.

BACKGROUND ART

There are known methods for casting products in molds, obtained by the method of layer-wise generation of three-dimensional models from powdered material. In the known methods the molds are two or more shells, and optionally their respective cores, which are constructed as separate elements, independently of one another. After construction of these elements, they must be assembled and placed in special molding boxes. This worsens the accuracy, creates difficulties, slows and raises the cost of the process of the construction of the molds, which in turn makes the casting in such molds ineffective.

There are known systems for layer-wise generation of three-dimensional models from powdered material (US 2004/0035542A1, US 20040026418A1), in which the devices for raising and lowering the work plate, on which the application of layers of material is performed, are part of a removable container whose removable bottom is the work plate. The vertical drive of the raising and lowering devices is done by screw gearings located in the removable container.

The disadvantages of lifting systems, that have a built-in driving device, is that there is a need for a synchronized movement, which is realized technologically with more difficulties and requires precise manufacturing of the constituent components. Their protection from pollutants is more difficult and they require more frequent maintenance. Another major drawback of the built-in driving device is the inability to use the container for direct casting due to the heat input and high levels of heating.

DISCLOSURE OF THE INVENTION

The task of the invention is to provide a method for direct casting of cast components by layer-wise generation of composite molds, wherein the composite molds are constructed as monolithic elements and simultaneously with their respective cores. Another task of the invention is to provide direct casting in the composite molds constructed, without removing them from the container in which they are constructed.

Another task of the invention is to establish a system for layer-wise generation of three-dimensional models from powdered material, in which the container, where three-dimensional models are constructed, is separated from the devices for lifting and lowering the work plate. It also aims to provide a compact and reliable device for lifting and lowering the work plate, which device is integrated into the system for layer-wise generation of three-dimensional models from powdered material.

For solving these problems, according to the invention a method for direct casting of cast components by layer-wise generation of composite molds is established, comprising the following successive stages:

- stage of layer-wise generation of composite molds which includes sequential application of powdered material and suitable binder onto a the vertically movable worktop in a system for layer-wise generation of three-dimensional objects from a powdered material, where the application of the binder is carried out following a preset pattern over a layer of the molds being generated and the said worktop is a vertically movable bottom plate of a removable container for direct casting, located in the work area of the system on which movable bottom is generated one or more monolithic non-detachable composite molds with or without integration of one or more cores;
- stage of lowering the movable bottom in the lower position, after the generation of the aforementioned one or more molds in the event that at the preceding stage of generation of composite molds the entire working height of the container was not used;
- removing the container for direct casting with the already generated one or more molds from the working area of the system for layer-wise generation of three-dimensional objects from powdered material;
- stage of removing the excess unbound powdered material from the working cavities of the said one or more molds by suction or flowing out depending on the configuration of the working cavities which are thus prepared for direct casting into the container for preparation of cast components;
- stage of direct casting in the said one or more molds without removing them from the said container;
- stage of removing the cast components from the same container after they are cooled down and subsequent cleaning of residual powdered material;
- stage of final removal of sprue systems, feeder heads, and other elements of the cast components until the desired cast component is obtained.

According to the proposed method the composite molds are generated as monolithic molds and simultaneously with their respective cores in an assembled form, and then the excess unbound powdered material is removed to form a mold with the working cavities to be filled with molten metal. This creates the opportunity for direct casting in the monolithic composite molds in the removable container, without the need to generate separate molds and cores, as in conventional technologies.

Preferably, the removal of the powdered material is carried out by vibration or by vacuum suction, or by a combination of both.

In a preferred embodiment of the method, the said movable bottom of the container for direct casting moves vertically between the upper end position and lower end position by a device for lifting and lowering the movable bottom, integrated into the system for, layer-wise generation of three-dimensional objects from powdered material.

During the generation of the mold, the container for direct casting is positioned and fixed in the system for layer-wise generation of three-dimensional objects by means of retainers.

A system for layer-wise generation of three-dimensional objects from powdered material for direct casting is established, which includes a vertically movable worktop, devices for multiple sequential application of powdered material and a suitable binder following a preset pattern over a layer of the three-dimensional object being generated on the said worktop, where the application devices are located above the mentioned worktop, which is a vertically movable bottom of a removable container for direct casting. The system includes also a built-in device for lifting and step-by-step lowering of the said vertically movable bottom of the container between the upper end position and the lower end position, where the movable bottom is limited against going out of the container when reaching the lower end position, and the container is made of a material that allows direct casting into it after removing it from the system for layer-wise generation of three-dimensional objects.

Preferably, the removable container is provided at the bottom part with four swivel wheels.

Preferably, the system has retainers for positioning and locking the removable container in the working position.

In a preferred embodiment of the system, the device for lifting and lowering of the said vertically movable bottom includes a scissor lifting system, which is mounted at the base of the system and is located below the removable container, fixed in working position in the system.

The device for lifting and lowering of the vertically movable bottom of the removable container in the preferred embodiment of the invention is a system of scissor type which is compact and can be located immovably under the removable container. This scissor driving system, which is external for the container, avoids the disadvantages of the lifting equipment integrated in the container and allows direct casting into the removable container after its removal from the system and cleaning the excess unbound powdered material to form the working cavities to be filled with molten metal.

In a preferred embodiment, the said scissor lifting system consists of two pairs of elongated scissor arms arranged at a distance from one another, where the two arms of each pair are arranged crosswise to one another, and the two pairs of arms are connected to one another by means of a central axle at the point of crossing of the arms and four end axles connecting the ends of the arms, as two of the end axles connect the lower ends of the arms and are vertically fixed, wherein one lower end axle is horizontally fixed, and the other lower end axle is horizontal movable and is guided by two horizontal lower rails, and the other two of the end axles connect the upper ends of the arms and an upper support element and are vertically movable, as one upper end axle is horizontally fixed, and the other upper end axle is horizontally movable and is guided by two horizontal upper rails, wherein the driving device of the scissor lifting system comprises an electric motor with a reduction gear driving an opposite bearing supported screw-nut gear which is adapted to drive in two opposite directions two sets of four rollers each carried respectively by two horizontal bearing beams, as the bearing beams are arranged on both sides and parallel to the central axle in its horizontal plane, and on the opposite ends of each bearing beam are mounted next to one another two rollers so as to be in constant contact with and with the possibility of rolling onto one of the side surfaces, respectively, of one of the arms, which side surfaces of the arms are directed towards the horizontal plane of the central axle, and the driving device of the scissor system is adapted so that in the direction of separation of the roller carriers the ends of the scissor arms in each pair are brought together towards the horizontal plane of the central axle and respectively lower the upper support element, and in the direction of bringing together of the roller carriers the ends of the scissor arms are moved away from the horizontal plane of the central axle and accordingly raise the support element, as the driving device is electrical and is equipped with protected flexible wiring.

DESCRIPTION OF THE DRAWINGS

In more detail, the method and the system according to the invention are illustrated by means of the preferred embodiment, given by way of an example non-limiting the scope of the invention, with reference to the enclosed drawings, where.

EMBODIMENTS AND ACTION OF THE INVENTION

Figure 1:
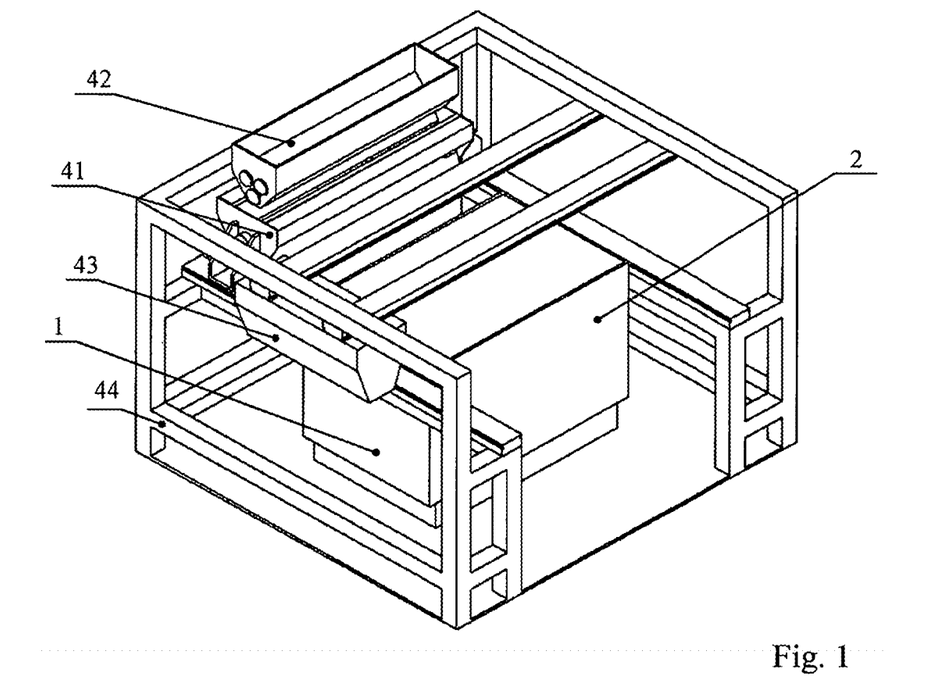
FIG. 1 schematically depicts in a perspective view the system for layer-wise generation of three-dimensional models from powdered material according to the invention.

According to this invention, the generation of a composite mold for use in the method of direct casting is carried out by a system for layer-wise generation of three-dimensional objects from a powdered material, such as sand. FIG. 1 is a schematic representation of a system embodiment for layer-wise generation of three-dimensional objects from a powdered material, given as an example which does not limit the scope of the invention. The system includes a vertically movable worktop 2, device 41 for multiple sequential application of a powdered material, loading device 42 for powdered material, device 43 for multiple application of a suitable binding agent following a preset pattern over a layer of the three-dimensional object being generated onto the said worktop 2, where the application devices 41 and 43 are positioned above the worktop 2. The elements of the system are located and installed with the possibility of movement of the supporting structure 44.

According to the invention, the worktop 2 is a vertically movable bottom of the removable container 1 for direct casting. Preferably, container 1 has an area equal to the work area and a height, also equal to the height of the system for layer-wise generation of three-dimensional models from powdered material. When container 1 is empty, the movable bottom 2 lies in the lower part of the container 1. The movable bottom 2 is limited against going out of the container 1 upon reaching the lower end position in order to allow direct casting into the container after removal from the system for layer-wise generation. The container 1 can be constructed of any material suitable for the purpose of direct casting, such as constructional steel which is resistant to temperatures up to 300° C.

Preferably, in the system are provided retainers 3 for locking the container 1 in the working position. The retainers are installed immovably at the base of the system for layer-wise generation of three-dimensional objects.

The system includes also an integrated lifting device 4 adapted for lifting and step-by-step lowering of the said vertically movable bottom 2 between the upper end position and lower end position. The lifting device 4 is integrated into the base of the system and is located in the working area of the system, respectively under the working position of the container 1 for direct casting. Preferably, the lifting device 4 is of the scissor type. It has a scissor kinematic structure that makes it possible to realize high lifting from an initial low height.

Figure 3:
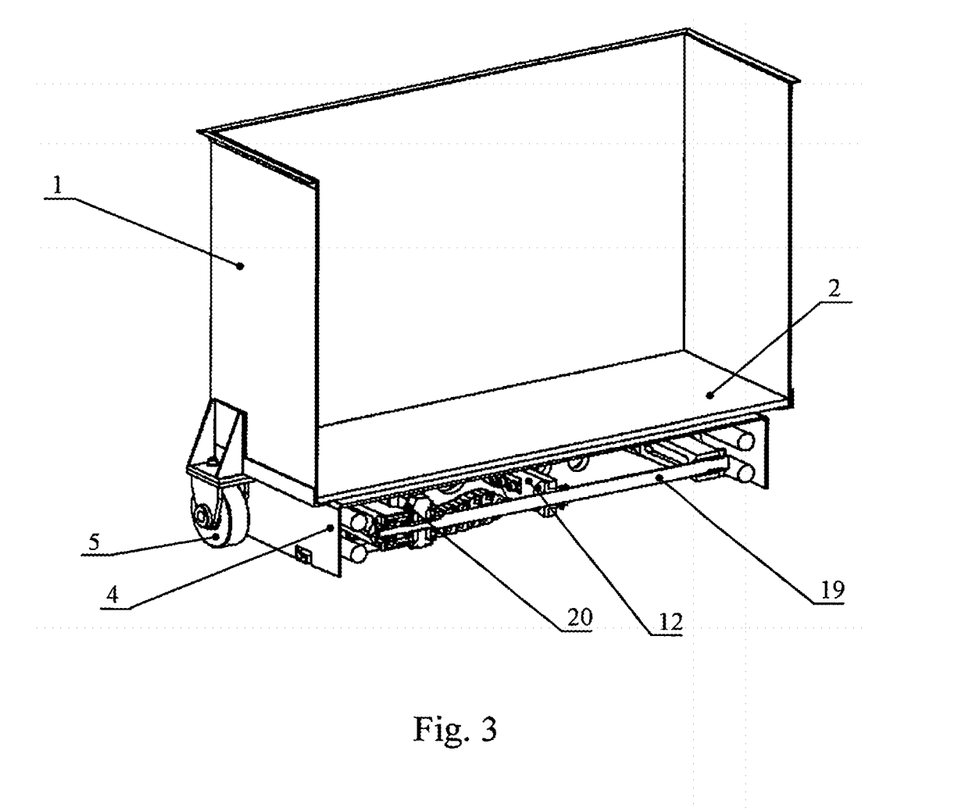
FIG. 3 shows the container for direct casting in working position in the system for layer-wise generation, above the lifting and lowering devices, where the movable bottom of the container is in the lower end position.
Figure 4:
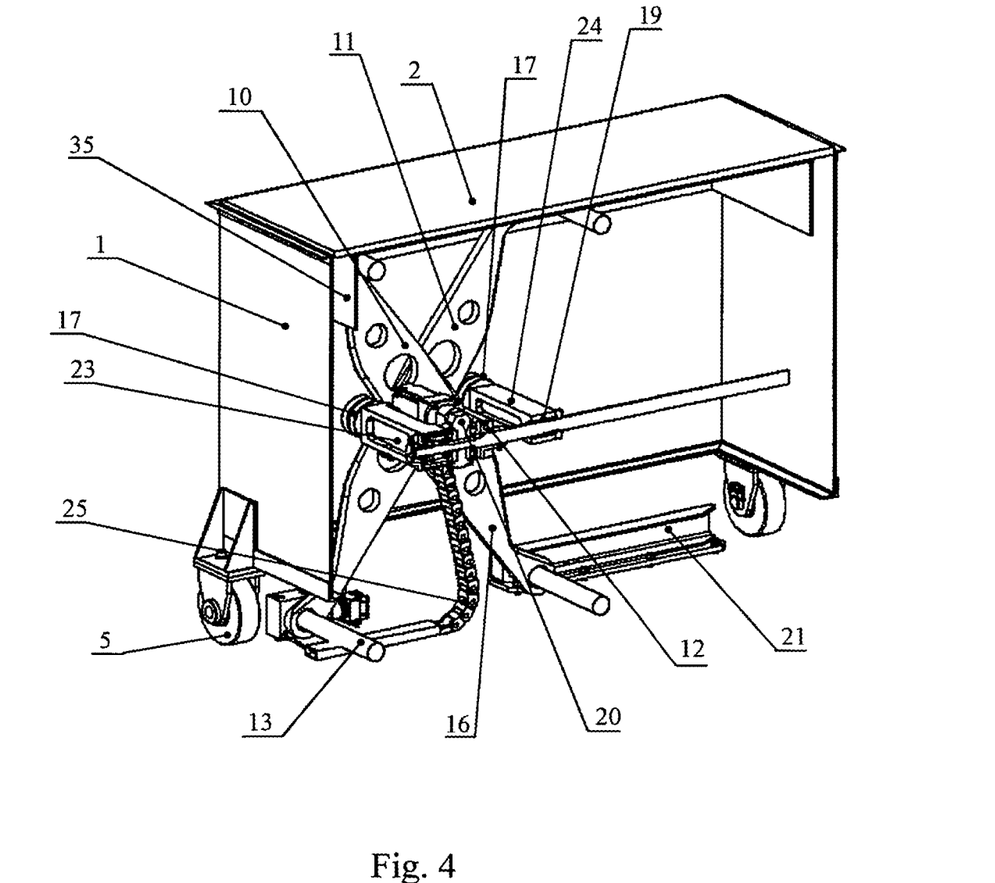
FIG. 4 sideways, in the longitudinal section shows the container for direct casting and the scissor system for lifting and lowering in the upper position. The figure, as well as FIG. 5 depicts only one of the pairs of arms of the scissor system.
Figure 5:
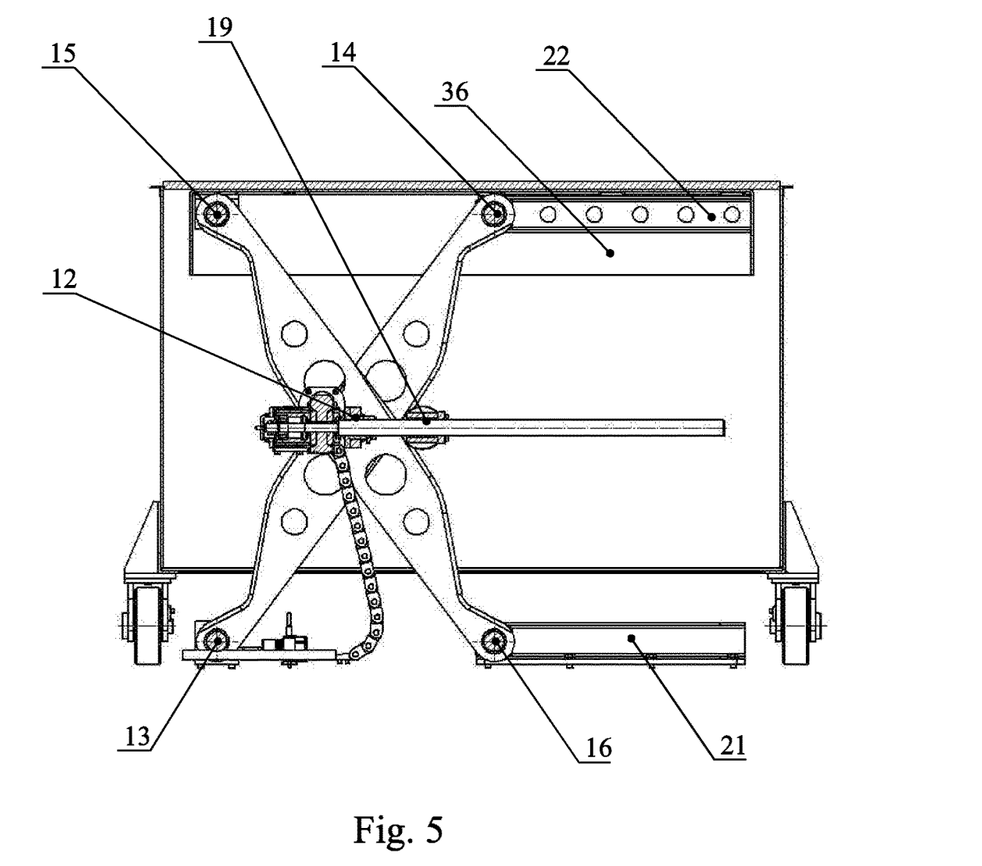
FIG. 5 in the longitudinal section shows the container for direct casting and the scissor system for lifting and lowering in the upper position.

In the preferred embodiment, illustrated in FIGS. 3, 4 and 5, the lifting device 4 is a scissor lifting system, which consists of two pairs of elongated scissor arms arranged at a distance from one another, where the two arms 10 and 11 of each pair are arranged crosswise to one another and are adapted to lift and lower the upper support element 35. The upper support element is designed to contact with the lower part of the movable bottom 2 of the container 1 according to the invention. In a preferred embodiment of the invention, the upper support element 35 has the shape of a cuboid, which is open underneath, consisting of an upper horizontal support plate and four side walls. In this embodiment of the invention, the upper support element 35 when is at the lower end position serves also as a lid protecting the scissor lifting system 4 from pollution during the replacement of the containers 1 for direct casting in the system. The two pairs of arms 10 and 11 are interconnected by one central axle 12 in the point of crossing of the arms and four end axles connecting the ends of the arms 10 and 11 of the two pairs. Two of the end axles 13 and 16 connect the lower ends of the arms, respectively 11 and 10, and are vertically fixed, wherein one lower end axle 13 is horizontally fixed and is mounted rotatably at the base of the system, and the other lower end axle 16 is horizontally movable and is guided by two horizontal lower rails 21 fixed at the base of the system. The other two of the end axles 14 and 15 connect the upper ends of the arms, respectively 11 and 10, and are vertically movable, as one upper end axle 15 is horizontally fixed and is mounted rotatably to two of the side walls of the upper support element 36 and the other upper end axle 14 is horizontally movable and is guided by two horizontal upper rails 22 fixed in the said two side walls of the upper support element 36. The driving device of the scissor lifting system comprises an electric motor with a reduction gear 20 driving the opposite bearing supported screw-nut gear 19, which is adapted to drive in two opposite directions two sets of four rollers each 17 supported respectively by two horizontal bearing beams 23 and 24. The bearing beams of the rollers are arranged on both sides and parallel to the central axle 12, in its horizontal plane. On the opposite ends of each bearing beam 23 or 24 are mounted two rollers next to one another so as to be in constant contact with and capable of rolling onto one of the side surfaces, respectively, of one of the two scissor arms 10 or 11, which side surface is directed towards the horizontal plane of the central axle 12. The driving device of the scissor system is adapted so that in the direction of separation of the bearing beams 23 and 24 the ends of the scissor arms 10 and 11 in each pair are brought together towards the horizontal plane of the central axle 12 and, respectively, lower the movable bottom 2 of the container 1, and in the direction of bringing together of the bearing beams 23 and 24 the ends of the scissor arms 10 and 11 are moved away from the horizontal plane of the central axle 12 and respectively raise the movable bottom 2. The driving device is electrical and is equipped with protected flexible wiring 25.

The system for direct casting may have a different structure from that shown in FIG. 1. For example, the devices for applying a powdered material and a binder may be constructed and arranged in a different manner relative to one another, for example, may be placed side by side. They may be part of a common applying unit or they may be two, three or more independent devices.

The method for direct casting of cast components by layer-wise generation of composite molds according to the invention comprises several consecutive stages.

In the first stage, the layer-wise generation of composite molds is carried out by multiple sequential application of a powdered material and of a suitable binding agent on the vertically movable worktop 2 in a system for layer-wise generation of three-dimensional objects from a powdered material, for example the system described above. The application of the binding agent is carried out following a preset pattern over a layer of the molds being generated. The said worktop 2 is a vertically movable bottom of the removable container 1 for direct casting, onto which are generated one or more monolithic non-detachable composite molds 27 with or without integration of one or more cores.

Figure 2:
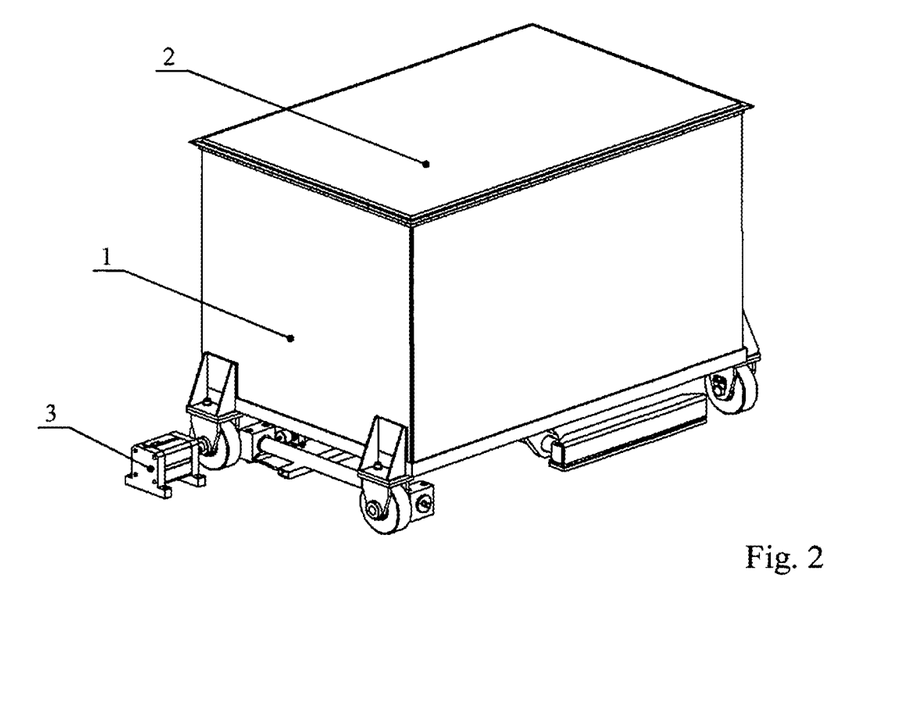
FIG. 2 shows the container for direct casting in working position in the system for layer-wise generation, above the lifting and lowering devices, where the movable bottom of the container is in the upper end position.

Before starting work, in the system for layer-wise generation of three-dimensional objects is loaded an empty container 1 for direct casting, the said container is located in the working area of the system, above the lifting device 4, integrated in the system, and is locked. The fixing of the container 1 in the working position in the system is performed by the retainers 3. After that the lifting device 4 raises the movable bottom 2 at the upper end of the container 1 to the working plane for application of layers. The application of the material and the subsequent application of the binding agent by the application devices 41 and 43 begins in the upper end position of the movable bottom 2 wherein it is aligned with the upper edge of the container (FIG. 2).

After application of a layer of a powdered material and, respectively, a binder, due to the requirement for the level of deposition to be always constant, the already formed layers must be lowered by a step equal to the thickness of one layer. After application of the respective layer and the binder, the lifting device 4 lowers the movable bottom 2 by a step equal to the thickness of the layer and this procedure is performed multiple times until the object or objects being generated are finished, or until the full stroke of the bottom in the vertical direction is completed.

In the event that at the stage of generation of composite molds 27 the entire working height of the container 1 is not used, then a stage of lowering the movable bottom 2 in the lower end position follows.

In the next stage the container for direct casting, with already generated one or more molds 27, is removed manually or automatically out of the system for layer-wise generation of three-dimensional objects passing over the lifting device 4, which is in its lowest position. The container 1 is replaced with another identical container for the next operating cycle of the system within the shortest possible time frame with the purpose of achieving greater performance of the overall cycle. The next container 1 is set fixedly using the fixing elements 3, which determine its exact location and preclude it from possibly moving.

Figure 6:
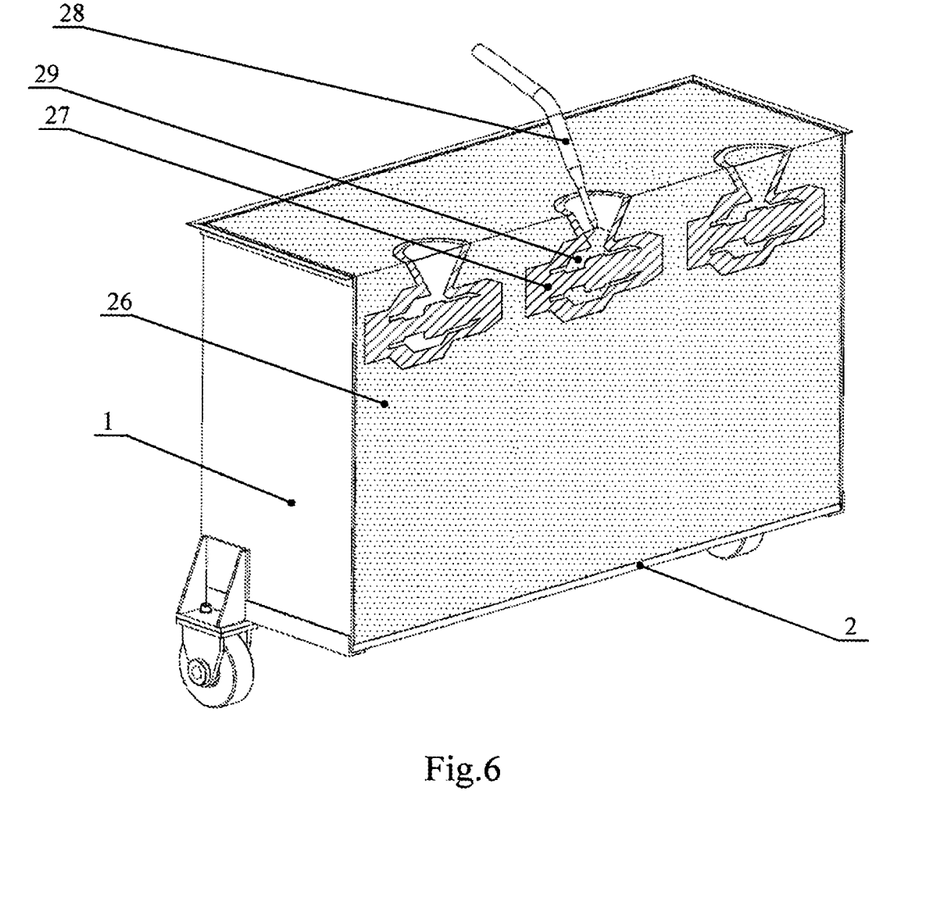
FIG. 6 in a sectional view depicts the container for direct casting with generated molds, respectively from right to left:
  a finished mold with un-removed unbound powdered material in the working cavities,
  a mold in the stage of removal of the excess unbound powdered material from the working cavities by suction,
  a mold with freed working cavities, ready for direct casting.

In the next stage of the method the container 1, which has been removed from the system, is taken away for removing the excess unbound powdered material 29 to form the working cavities of the molds 27 to be filled with molten metal. At the same time the unbound powdered material 26, filling the container 1 and enclosing outside the molds 27, is not removed. Preferably, the removal of the powdered material 29 from the working cavities of the molds 27 is carried out by vibration or by vacuum suction, or by a combination of both. FIG. 6 schematically depicts a device for vacuum extraction 28. After cleaning the working cavities, the possibility is created for direct casting into the casting molds 27 in the removable container 1 after its removal from the machine.

Figure 7:
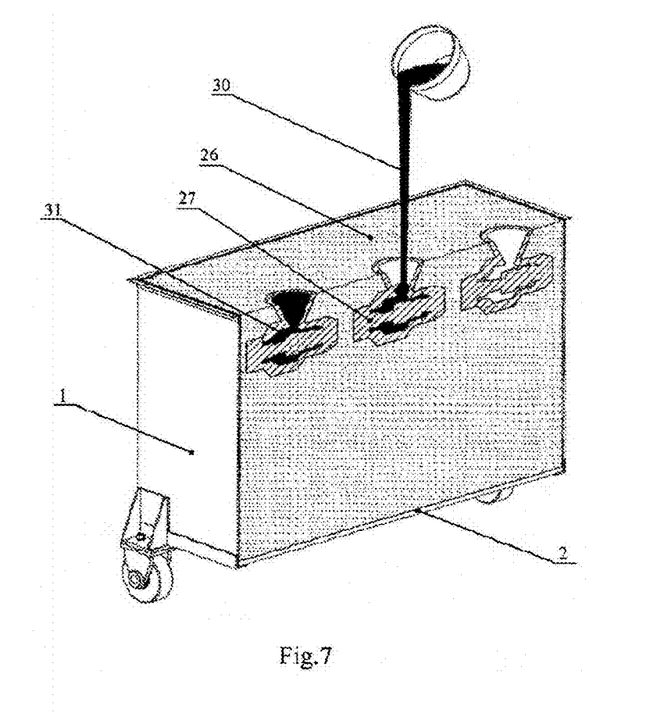
FIG. 7 in a sectional view shows the container for direct casting, with generated molds, in the stage of direct casting.

The next stage is that of direct casting of the melt 30 in the said one or more molds 27 without removing them from the said container 1, as is schematically depicted in FIG. 7.

Figure 8:
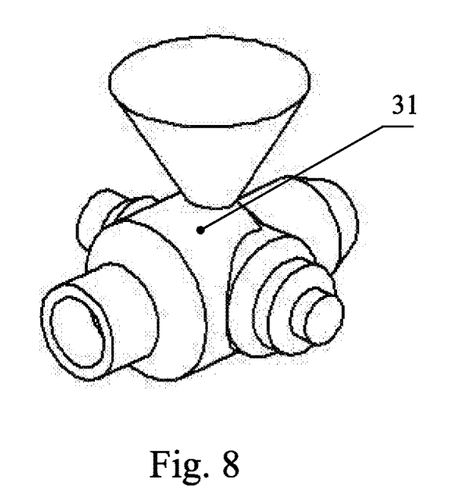
FIG. 8 depicts a finished cast component, from which the mold is removed, but with still un-removed sprue.

After cooling of the cast components 31 they are removed from the container 1 and are cleaned of residual powdered material 26.

In the last stage of the method, the sprue systems, feeder heads and other elements of the cast components 31 are removed completely until the desired cast component is obtained.

For specialists in the field it will be clear that various modifications may be made to the method and system, which also fall within the scope of the invention defined in the appended claims. All parts of the system can be replaced with technically equivalent elements.

The reference numbers of the technical features are included in the claims for the sole purpose of increasing the intelligibility of the claims and, therefore, these reference numbers do not have any limiting effect on the interpretation of elements indicated by these reference numbers.

The invention claimed is:

1. A method for direct casting of cast components by layer-wise generation of composite molds comprising the following successive stages:
   a stage of layer-wise generation of composite molds comprising multiple sequential application of a powdered material and of a suitable binder onto a vertically movable worktop in a system for layer-wise generation of three-dimensional objects from a powdered material, where the application of the binder is carried out following a preset pattern over a subsequent layer of the molds being generated, and the said worktop is a vertically movable bottom of a removable container for direct casting, located in a work area of the system, wherein onto said movable bottom are generated one or more non-detachable monolithic composite molds with or without integration of one or more cores;
   a stage of lowering the movable bottom in a lower position, after the generation of the said one or more molds in the event that at the preceding stage of generation of the composite molds the entire working height of the container was not used;
   a stage of removal of the container for direct casting with the already generated one or more molds from the work area of the system for layer-wise generation of three-dimensional objects from a powdered material;
   a stage of removal of excess unbound powdered material from working cavities of said one or more molds, which are thus prepared for direct casting into the container for production of cast components;
   a stage of direct casting in said one or more molds without removing them from said container;
   a stage of removing the cast components from said container after they are cooled down and subsequent cleaning of residual powdered material; and
   a stage of final removal of sprue systems, feeder heads, and other elements of the cast components until the desired cast element is obtained.

2. The method according to claim 1, characterized in that the removal of the powdered material is carried out by vibration or by vacuum extraction, or by a combination of both.

3. The method according to claim 1, characterized in that said movable bottom of the container for direct casting moves vertically between upper end position and lower end position by means of a device for lifting and lowering the movable bottom, integrated in the system for layer-wise generation of three-dimensional objects from a powdered material.

4. The method according to claim 1, characterized in that the container for direct casting during the process of generation of the mold is positioned and fixed in the system for layer-wise generation of three-dimensional objects by means of retainers.

* * * * *